(12) United States Patent
Okui (10) Patent No.: US 8,820,640 B2
(45) Date of Patent: Sep. 2, 2014

(54) MAGNETIC CARD READER AND MAGNETIC DATA READ METHOD

(75) Inventor: Kohei Okui, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 420 days.

(21) Appl. No.: 12/740,706

(22) PCT Filed: Sep. 29, 2009

(86) PCT No.: PCT/JP2009/004962
§ 371 (c)(1),
(2), (4) Date: May 20, 2010

(87) PCT Pub. No.: WO2010/038413
PCT Pub. Date: Apr. 8, 2010

(65) Prior Publication Data
US 2010/0230494 A1 Sep. 16, 2010

(30) Foreign Application Priority Data

Sep. 30, 2008 (JP) .................................. 2008-252194
Sep. 30, 2008 (JP) .................................. 2008-252196

(51) Int. Cl.
*G06K 7/08* (2006.01)
*G11B 5/008* (2006.01)
*G11B 20/10* (2006.01)

(52) U.S. Cl.
CPC .. *G11B 5/00808* (2013.01); *G11B 2020/10805* (2013.01); *G06K 7/082* (2013.01); *G11B 2020/1062* (2013.01); *G11B 2220/17* (2013.01)
USPC ............................ 235/449; 235/451; 235/454

(58) Field of Classification Search
USPC ................. 235/436, 439, 449, 451; 360/2, 46
See application file for complete search history.

(56) References Cited

U.S. PATENT DOCUMENTS

| 4,513,199 | A | * | 4/1985 | Sidline | 235/449 |
| 4,573,192 | A | * | 2/1986 | Roth et al. | 382/100 |
| 2002/0154808 | A1 | * | 10/2002 | Jones et al. | 382/135 |
| 2002/0191312 | A1 | * | 12/2002 | Yokozawa et al. | 360/2 |
| 2008/0290166 | A1 | * | 11/2008 | von Mueller | 235/449 |

FOREIGN PATENT DOCUMENTS

| JP | 61-9871 | 1/1986 |
| JP | 08-197809 | 8/1996 |
| JP | 2007-250142 | 9/2007 |

* cited by examiner

*Primary Examiner* — Michael G Lee
*Assistant Examiner* — Tabitha Chedekel
(74) *Attorney, Agent, or Firm* — Frommer Lawrence & Haug LLP (57) ABSTRACT

The present invention improves the environment resistance performance of a magnetic card reader, and also improves the operation stability of a system including a higher-level device. Specifically to describe, the magnetic card reader 1, for reading magnetic data recorded in a card 4 by using a magnetic head 5, includes: a storage section (a part of a RAM 104) for storing the magnetic data read and acquired by using the magnetic head 5; a first comparing section for comparing the total number of data in the magnetic data with a prescribed first threshold; and a first judgment section for judging that the magnetic data is effective data when the total number of data in the magnetic data is less than or equal to the prescribed first threshold in the first comparing section.

10 Claims, 6 Drawing Sheets

MAGNETIC CARD READER AND MAGNETIC DATA READ METHOD

The present application claims priority from PCT Patent Application No. PCT/JP2009/004962 filed on Sep. 29, 2009, which claims priority from Japanese Patent Application Nos. JP 2008-252194 and JP 2008-252196, both filed on Sep. 30, 2008, the disclosure of which is incorporated herein by reference in its entirety.

BACKGROUND OF THE INVENTION

1. Field of the Invention

The present invention relates to a magnetic card reader that carries out at least either of reading and writing magnetic data recorded in a card-like medium made of paper, plastic, and the like; as well a magnetic data reading method.

2. Description of Related Art

Since early times, a card-like medium; for example a credit card, a pre-paid card, a cash card and the like; includes magnetic data such as specific information recorded in a magnetic stripe formed on the card-like medium. Used for recording magnetic data into such a card-like medium is, for example, a frequency modulation (FM) method (F2F method) that makes use of a combination of two types of frequencies. For regenerating magnetic data recorded with such a frequency modulation (FM) method, a magnetic head relatively slides with respect to the magnetic stripe of the card-like medium to acquire the magnetic data as analog signals, which are subsequently converted (demodulated) into digital signals, and then taken into a CPU (a decoding section) (Refer to Patent Document 1). In the case of a magnetic card reader disclosed in Patent Document 1, analog signals output from the magnetic head and amplified through a amplifying section are then demodulated in an F2F demodulating section so as to output a card transfer signal, a clock signal, and a data signal.

Generally speaking, in a magnetic card reader of a swiping operation type (by a manual transfer method), resources such as a memory are often provided with restriction in order to materialize an inexpensive configuration (i.e., a magnetic card reader equipped with a small size of memory is used). Therefore, occasionally the size (capacity) of a buffer for storing magnetic data cannot include a sufficient allowance (margin). If once the size of magnetic data read exceeds the size of the buffer, the excessive part of the magnetic data read is omitted, and meanwhile the part of the magnetic data stored in the buffer is transmitted to a higher-level device unconditionally.

Furthermore, in the case of the magnetic card reader disclosed in Patent Document 1, a certain amount of bit data is thrown out (omitted) hardware-wise at the start of reading a magnetic card for the purpose of removing an unstable factor at an initial stage of operation. The unstable factor includes mechanical vibrations generated at the time when the magnetic card and a magnetic head contact each other, as well as electrical noises from a surrounding environment. More specifically to describe, if a noise exists at the top of an analog signal, an F2F demodulating section of the magnetic card reader identifies the noise part as a top part of a preamble and carries out omitting the part. The number of data (i.e., the number of bits) to be omitted hardware-wise (hereinafter, called the number of data for omission) is specified with an optimum value according to data accumulated experimentally and empirically.

Patent Document 1: Japanese Unexamined Patent Application Publication No. 2007-250142 (Paragraph [0015])

However, in the case of a magnetic card reader in which data stored in a buffer is unconditionally transmitted to a higher-level device, there exists a problem of environment resistance. In a radio-wave test (an immunity test) in which radio-waves of a certain frequency range are continually transmitted, the magnetic card reader affected by radiation in sympathetic vibration with a circuit constant may misjudge that it has received magnetic data, and it stores the magnetic data into the buffer. Eventually, though the magnetic data itself is meaningless, the magnetic data stored in the buffer is unconditionally transmitted from the magnetic card reader to the higher-level device. As a result, an error handling operation is carried out in the higher-level device. When the magnetic card reader is installed under the same environment as the radio-wave test, the higher-level device needs to carry out error handling operation so frequently that consequently the environment resistance performance such as resistance against radio-waves, resistance against noises, and the like becomes worsened. Furthermore, when the higher-level device is frequently requested to carry out the error handling operation, the operation stability of the system may be weakened.

However, if omitting the data is carried out uniformly and simply with a predefined number of data for omission, there appears a lack of operation stability at the time of reading magnetic data. That is to say; a large number of data for omission results in an improvement in error resistance, however on the other hand, an excessively large number of data for omission may cause even an omission of effective magnetic data. As described above, the number of data for omission is specified with an optimum value according to data accumulated experimentally and empirically. However, since the magnetic data omitted cannot be reproduced anymore, it is preferable in reality to specify the number of data for hardware-wise omission as small as possible (though excessively reducing the number of data for omission simply results in worsened error resistance by contraries).

Moreover, in the case where exists ineffective magnetic data, the number of which being greater than the specified number of data for omission, due to effects of a noise and the like for example, there also lies a problem that a next operation step proceeds. Specifically to describe, when ineffective magnetic data is read, wherein the number of the magnetic data being greater than the specified number of data for hardware-wise omission (the predefined number of magnetic data (the number of bits)), a next operation step proceeds without any judgment on the excessive part of the ineffective magnetic data about whether the part of the magnetic data is effective or not. Then the excessive part of the magnetic data is detected to be ineffective after completion of decoding operation in a higher-level device connected to the magnetic card reader. Therefore, when an error is detected in the higher-level device, a user is requested to carry out operation (for example, man-made operation) again, and it means that the system is poor in its operation performance.

SUMMARY OF THE INVENTION

It is a first object of the present invention to provide a magnetic card reader that can improve its environment resistance performance.

Furthermore, it is a second object of the present invention to provide a magnetic card reader that can improve operation stability at the time of reading magnetic data while eliminating ineffective magnetic data caused due to a disturbance such as a noise, as much as possible; and that can also improve its user operability.

To achieve the objects described above, the present invention provides the following embodiments.

(1) A magnetic card reader, for reading magnetic data recorded in a card-like medium by using a magnetic head, including: a storage section for storing the magnetic data read and acquired by using the magnetic head; a first comparing section for comparing the total number of data in the magnetic data with a prescribed first threshold; and a judgment section for judging that the magnetic data is effective data when the total number of data in the magnetic data is less than or equal to the prescribed first threshold in the first comparing section.

According to this embodiment; when "the total number of data" in the magnetic data read and acquired by using the magnetic head is less than or equal to the prescribed first threshold, the magnetic data is dealt with as effective data. Therefore, as far as the effective magnetic data is transmitted to a higher-level device, it is not necessary for the higher-level device to carry out error handling operation so often, and accordingly it becomes possible to eliminate false recognition on data receiving caused by radio waves, and to improve the environment resistance performance.

(2) The magnetic card reader discussed above; wherein the first comparing section compares the total number of data in the magnetic data with the prescribed first threshold, if the total number of data in the magnetic data is greater than the number of data in magnetic data stored in the storage section.

According to this embodiment, the first comparing section functions when magnetic data read by the magnetic head exceeds the storage capacity of the storage section. Therefore, it is not required to always fulfill the function of the first comparing section. Accordingly, a software-wise processing load can be reduced.

(3) The magnetic card reader discussed above; wherein the magnetic card reader further includes a counter for counting the total number of data in the magnetic data and the number of the data in magnetic data stored in the storage section.

According to this embodiment, the counter function makes it possible to easily count "the total number of data" in the magnetic data; and therefore, it becomes possible as described above to improve the environment resistance performance such as resistance against radio-waves, resistance against noises, and the like.

Especially, in this embodiment, the counter is prepared for counting not only the number of the data in magnetic data stored in the storage section, but also the total number of data in the magnetic data. To describe in detail; in a conventional magnetic card reader, if once the magnetic card reader has read magnetic data (through reading operation) exceeding the storage capacity of the storage section (an uppermost limit of the buffer), counting the number of data in the read data (through reading operation) gets stopped. Then, magnetic data, being detected, is once stored in the storage section, but the conventional magnetic card reader has a configuration in which the magnetic data is thrown away if the magnetic card reader has read magnetic data being greater than the storage capacity. Therefore, the uppermost limit for counting the number of data is equal to the storage capacity. Consequently, in this case, although the number of data in the magnetic data stored in the storage section can be counted, it is unknown how large number of data in the magnetic data is actually counted (the total number of data in the magnetic data). However, the counter placed in the magnetic card reader according to the present embodiment can count both the total number of data in the magnetic data and the number of data in the magnetic data stored in the storage section.

Incidentally, the "counter" in the present embodiment may be physically-multiple counters, or it may as well be a single counter having multiple variables. Still otherwise, the "counter" may be a single counter having a single variable but having separate variable ranges individually, or it may as well have any other mode.

(4) The magnetic card reader discussed above; wherein the prescribed first threshold is a value calculated by adding a prescribed first number of data to the number of data in the magnetic data recorded in the magnetic card specified according to ISO standards.

According to this embodiment, when a magnetic card conforming to ISO standards is swiped or inserted, it can be judged accurately whether the magnetic data acquired by using the magnetic head is effective or not. Incidentally, the "prescribed first number of data" in the present embodiment is a value specified according to experiments and experience; and for example, it can be 10% of the number of data in the magnetic data recorded in the magnetic card specified according to ISO standards.

(5) The magnetic card reader discussed above; wherein magnetic data judged to be effective by the first judgment section is transmitted to a higher-level device; and meanwhile magnetic data judged not to be effective by the first judgment section is omitted.

According to this embodiment, the number of transmitting operations of transmitting erroneous magnetic data from the magnetic card reader to the higher-level device can be reduced. As a result, the number of error handling operations in the higher-level device can be decreased, so that the environment resistance performance of the magnetic card reader such as resistance against radio-waves, resistance against noises, and the like can be improved.

Incidentally, "omit" in this context means not only deleting magnetic data but also ignoring the magnetic data softwarewise (not dealing with it as effective magnetic data) without deleting it.

(6) A magnetic card reader discussed above, for reading magnetic data recorded in a card-like medium by using a magnetic head, including: a second comparing section for comparing the number of data in the magnetic data read and acquired by using the magnetic head with a prescribed second threshold; and a second judgment section for judging that the magnetic data is ineffective data when the number of data is less than or equal to the prescribed second threshold in the second comparing section.

According to this embodiment; even when the magnetic card reader is used under a poor environment including a serious disturbance, it is possible to improve operation stability at the time of reading the magnetic data, and also to improve the user operability.

In other words, a software-wise judgment process by using a threshold is carried out by both functions of the second comparing section and the second judgment section, ineffective magnetic data can easily be eliminated. Furthermore, it becomes possible to avoid a chance of omitting effective magnetic data, while such a mis-operation could happen conventionally; and also to improve the stability of reading magnetic data.

Moreover, in the magnetic card reader according to the present embodiment, the "number of data" in the magnetic data read and acquired by using the magnetic head is compared with the prescribed second threshold in the second comparing section. Then, using the comparison result, the judgment section judges whether the magnetic data is ineffective or not. Thus, a judgment can be made on whether or not the magnetic data is ineffective, before implementing a decoding operation for the magnetic data. Therefore, the magnetic card reader does not transmit an erroneous notification to the higher-level device. Accordingly, the higher-level device does not need to request a device user to carry out operation again so that the user operability can be improved.

(7) The magnetic card reader discussed above; wherein the magnetic card reader further includes an omitting section for omitting the magnetic data of a prescribed second number of data out of the magnetic data read and acquired by using the magnetic head.

According to this embodiment; the magnetic card reader includes an omitting section for omitting the magnetic data of the prescribed number of data (the number of data for omission) out of the magnetic data read and acquired by using the magnetic head. Therefore, while the omitting section is omitting the magnetic data uniformly according to the prescribed bit number, the software-wise judgment process by using the threshold can be carried out by both the functions of the second comparing section and the second judgment section, as described above. Accordingly, minimizing the number of data (i.e., the number of bits) to be omitted in the omitting section (the number of data for hardware-wise omission), the omitting section specializes in removal of a mechanically-unstable data part caused at the time of starting operation; and meanwhile the second comparing section and the second judgment section can specialize in removal of an electrical noise from a surrounding environment so that the stability of reading the magnetic data can be further improved. Incidentally, "omit" in this context means not only deleting magnetic data but also ignoring the magnetic data software-wise (not dealing with it as effective magnetic data) without deleting it.

(8) The magnetic card reader discussed above; wherein the prescribed second threshold is the prescribed number of data, which can be processed in the higher-level device, among the total number of data in the magnetic data recorded in one line in the longitudinal direction of the card-like medium.

According to this embodiment; the prescribed threshold described above is the prescribed number of data, which can be processed in the higher-level device, among the total number of data in the magnetic data recorded in one line in the longitudinal direction of the card-like medium. Therefore, if the comparing section and the judgment section detect magnetic data corresponding to the prescribed number of data, which can be processed in the higher-level device, among the total number of data, it can be judged that the magnetic data has been read correctly. Empirically, the number of data of electrical noises due to the environmental condition is often less than the prescribed number of data described above. Therefore, it becomes possible to efficiently discriminate between effective magnetic data and ineffective magnetic data.

(9) The magnetic card reader discussed above; wherein the card-like medium has a plurality of tracks in which magnetic data is recorded; and the second comparing section makes a comparison for each track between the number of data in the magnetic data read and acquired by using the magnetic head and the prescribed second threshold.

According to this embodiment; the second comparing section described above makes a comparison for each track of the card-like medium between the number of data in the magnetic data read and acquired by using the magnetic head and the prescribed second threshold. Therefore, if the number of data greater than the prescribed second threshold is detected, the magnetic data is dealt with as effective data (then, for example, the magnetic data is transmitted to the higher-level device). By contraries, if the number of data being not greater than the prescribed second threshold is detected, the magnetic data can be dealt with as ineffective magnetic data caused due to a disturbance. As a result, even if there exists a mixture of effective magnetic data and ineffective magnetic data, only the effective magnetic data can be picked up. Eventually, it becomes possible to decrease a chance of carrying out operation again by user, and to contribute to improving the operability.

(10) The magnetic card reader discussed above; wherein magnetic data, which the judgment section judges to be ineffective data, is omitted.

According to this embodiment; magnetic data, which the judgment section described above judges to be ineffective data, is omitted. Therefore, frequent transmission of erroneous notification to the higher-level device can be suppressed, and eventually the user operability can be improved. Incidentally, as already described above, "omit" in this context also means not only deleting magnetic data but also ignoring the magnetic data software-wise (not dealing with it as effective magnetic data) without deleting it.

(11) A magnetic data reading method for reading magnetic data recorded in a card-like medium by using a magnetic head, including: comparing the number of data in the magnetic data read and acquired by using the magnetic head with a prescribed second threshold; and judging that the magnetic data is ineffective data when the number of data is less than or equal to the prescribed second threshold.

According to this embodiment; in the magnetic data reading method for reading magnetic data recorded in the card-like medium by using the magnetic head, the number of data in the magnetic data read and acquired by using the magnetic head is compared with the prescribed second threshold. Then, if the number of data is less than or equal to the prescribed second threshold, the magnetic data is judged to be ineffective data. Accordingly, as described above, it becomes possible to improve operation stability at the time of reading the magnetic data, and also to improve the user operability.

As described above; according to the present invention, magnetic data read and acquired by using the magnetic head is dealt with as effective magnetic data when the total number of data in the magnetic data is less than or equal to a prescribed first threshold. Therefore, the number of error handling operations in the higher-level device can be decreased, wherein errors are caused due to problems of the environment in which the magnetic card reader is installed, so that the environment resistance performance of the magnetic card reader such as resistance against radio-waves, resistance against noises, and the like can be improved.

Furthermore, according to the present invention, after the number of the magnetic data read and acquired by using the magnetic head is compared with a prescribed second threshold, it is judged whether the magnetic data is ineffective or not. Therefore, even when the magnetic card reader is used under a poor environment including a serious disturbance, it is possible to improve operation stability at the time of reading the magnetic data, and also to improve the user operability.

REFERENCE NUMERALS

1 Magnetic card reader
2 Frame
3 Datum surface for transfer motion
4 Card
5 Magnetic head
101 CPU of the magnetic card reader
102 Amplifying (AMP) circuit
103 Demodulating circuit
104 RAM
105 ROM
106 Decoder
110 CPU of the higher-level device

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
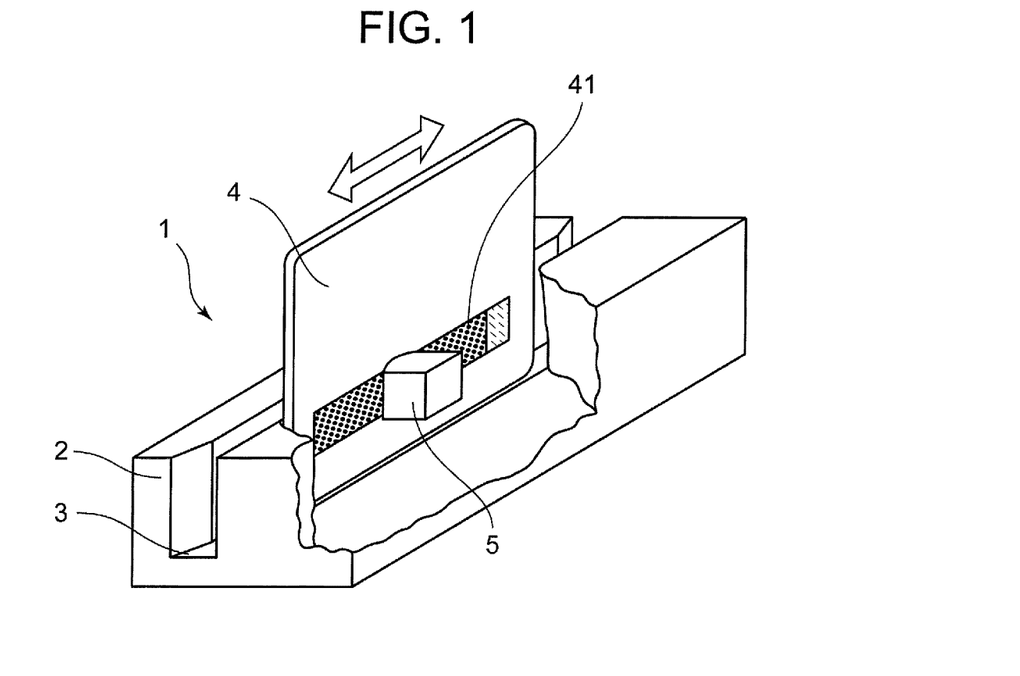
FIG. 1 is a schematic view showing an overview of a magnetic card reader according to embodiments of the present invention.

FIG. 1 is a schematic view showing an overview of a magnetic card reader 1 according to a first embodiment and a second embodiment of the present invention.

In FIG. 1, the magnetic card reader 1 includes: a frame 2, having its almost U-shaped cross section perpendicular to a swiping (manual transfer) direction and constituting a card transfer path; a datum surface for transfer motion 3 formed as a part (a bottom) of the frame 2; and a magnetic head 5 for reading magnetic data recorded in a magnetic stripe 41 on a surface of a card 4 (as an example of a card-like medium), or writing magnetic data into the card. As a two-direction arrow shows in the drawing, when the card 4 is swiped (transferred manually) along the datum surface for transfer motion 3 in the magnetic card reader 1, the magnetic data is read. Incidentally, though the magnetic head 5 of a read-only type is used in the present embodiment, a magnetic head provided with both a reading function and a writing function may be used instead. "Swiping" in the present specification means an operation of quickly and manually moving a card-like recording medium along a guide (the card transfer path) of the magnetic card reader 1.

The magnetic head 5 is so placed as to be present at the card transfer path. Then, the magnetic head 5 reproduces a signal according to the magnetic data of the card 4. Specifically to describe, when the magnetic stripe 41 on the surface of the card 4 contacts and slides over the magnetic head 5, the magnetic head 5 reads the magnetic data recorded in the magnetic stripe 41 and reproduces a regenerative signal according to the magnetic data.

Figure 2:
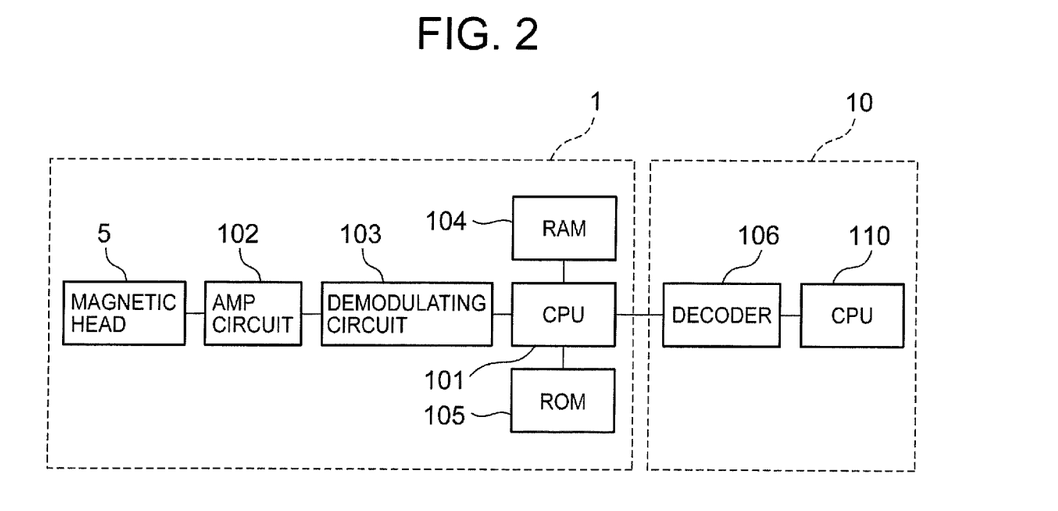
FIG. 2 is a block diagram showing an electrical structure of the magnetic card reader according to the embodiments of the present invention.

FIG. 2 is a block diagram showing an electrical structure of the magnetic card reader 1 according to the first and second embodiments of the present invention.

In FIG. 2, the magnetic card reader 1 according to the first and second embodiments of the present invention chiefly includes: the magnetic head 5, a CPU 101, an AMP circuit 102, a demodulating circuit 103, and a RAM 104, and a ROM 105. Incidentally, the RAM 104 and the ROM 105 may be built in the CPU 101 (as a built-in ROM and the like). In general, the ROM 105 includes a base program supporting a basic function of the magnetic card reader 1, and meanwhile the RAM 104 functions as a working area for the CPU 101. Furthermore, in the first and second embodiments, multiple (magnetic) tracks are placed on the magnetic stripe 41 along a longitudinal direction (the direction indicated by the two-direction arrow in FIG. 1) of the card 4, and therefore the magnetic head 5 is a model for a multi-channel type. However, a magnetic head for a single-channel type may as well be used instead.

Governing a central control core of the magnetic card reader 1, the CPU 101 integrally controls the magnetic card reader 1. The regenerative signal from the magnetic head 5 is amplified and waveform-shaped at the AMP (amplifying) circuit 102; demodulated at a demodulating circuit 103 (through binarizing the read signal); and then subsequently transmitted to the CPU 101.

The CPU 101 communicates with a higher-level device 10 through an I/F circuit (not shown). In the higher-level device 10, a CPU 110 carries out demodulation processing on binary digital data by using a decoder 106. As a result, the higher-level device 10 can acquire contents of the magnetic data.

First Embodiment

The first embodiment is described below.

In the magnetic card reader 1 according to the first embodiment, electrical components, such as the CPU 101, the RAM 104, and the ROM 105, constitute a 'first comparing section' and a 'first judgment section'. More specifically to describe, the ROM 105 stores a first comparing program for comparing the total number of data in the magnetic data read and acquired by using the magnetic head 5 with a prescribed first threshold, as well as a first judgment program for judging that the magnetic data is effective data when the total number of data in the magnetic data is less than or equal to the prescribed first threshold. Then, using the RAM 104 as a working area, the CPU 101 materializes the functions of the 'first comparing section' and the 'first judgment section' through executing these programs. Incidentally, in the first embodiment, the prescribed first threshold is stored in the RAM 104, but the first threshold may as well be stored in a memory such as an EEPROM or the like prepared separately. Furthermore, in the first embodiment, the prescribed first threshold is specified with a value calculated by 10% increase of the number of data in the magnetic data recorded in the card 4 specified according to ISO standards.

Furthermore, the ROM 105 also stores a first transmission program for transmitting the magnetic data, which the 'first judgment section' has judged to be effective, to the higher-level device 10; a first omitting program for omitting the magnetic data, which the 'first judgment section' has judged not to be effective; and the like. Then, using the RAM 104 as a working area, the CPU 101 executes these programs.

Moreover, the RAM 104 functions as a re-writable 'storage section' that stores the magnetic data read by using the magnetic head 5. Incidentally, in the present embodiment, the RAM 104 is a re-writable storage section and a part of the memory area of the RAM 104 is used as a 'data storage buffer', but for example, an entire part of the memory area of the RAM 104 may be used as a 'data storage buffer'.

Furthermore, the CPU 101, the RAM 104, and the like also work as a counter for counting the total number of data in the magnetic data read and acquired by using the magnetic head 5, and counting the number of data in the magnetic data stored in the data storage buffer. Incidentally, being separately from the CPU 101, a counter may be prepared. Explained below in detail is an operation flow of a magnetic data reading method according to the electrical structure describe above.

Figure 3:
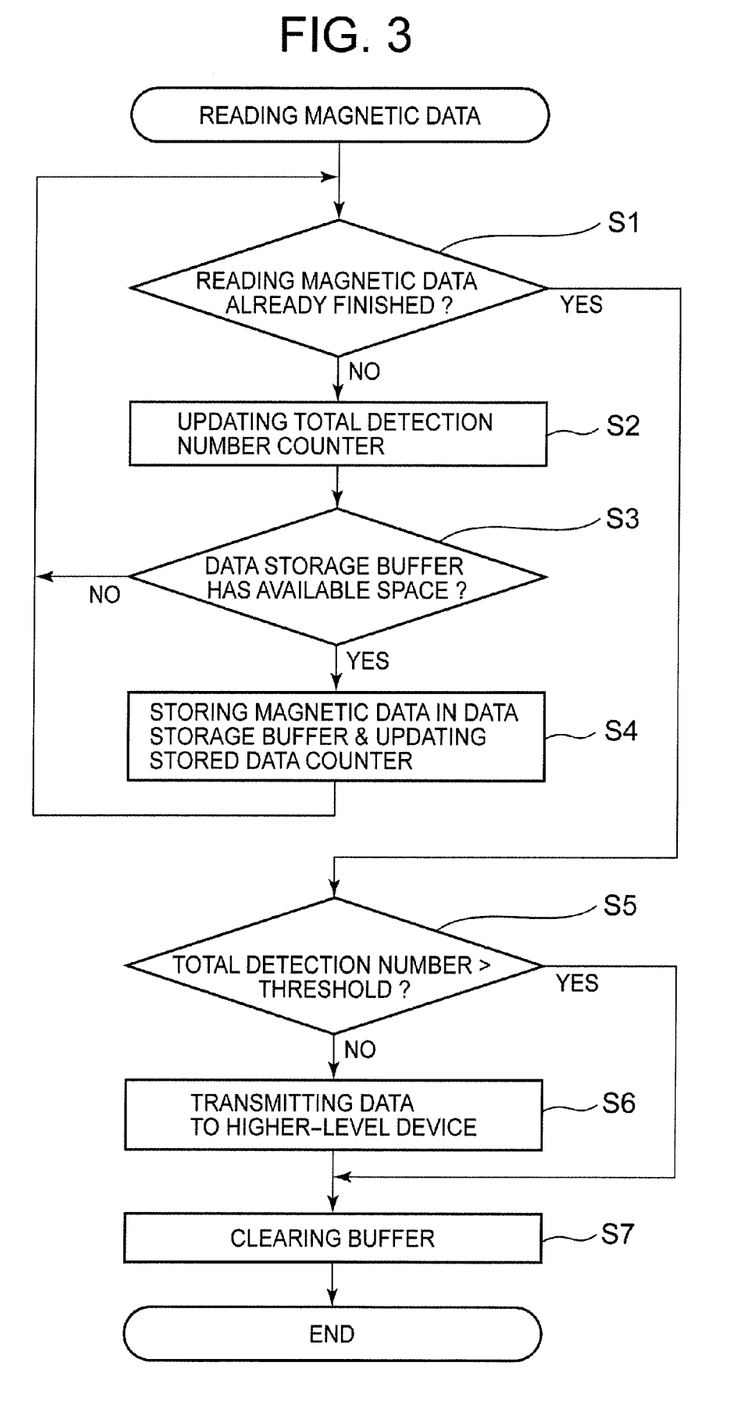
FIG. 3 is a flowchart showing an operation flow of a magnetic data reading method according to a first embodiment of the present invention.

FIG. 3 is a flowchart showing an operation flow of a magnetic data reading method according to the first embodiment of the present invention.

Figure 4:
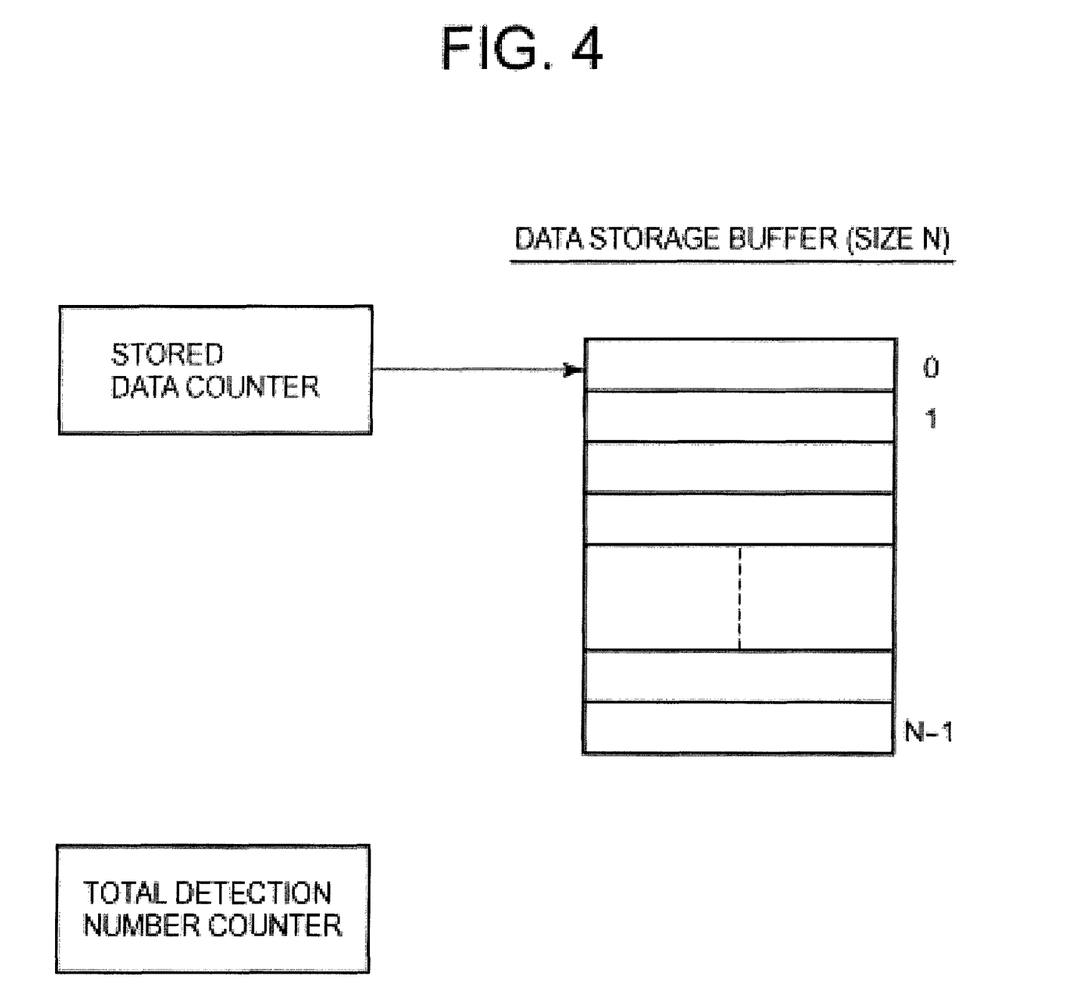
FIG. 4 is an explanatory drawing for explaining a concept of a total detection number counter and a stored data counter.

In FIG. 3, it is judged at first whether the magnetic data reading operation (reading the magnetic data) has already finished or not (Step S1). Specifically to describe, the CPU 101 of the magnetic card reader 1 judges whether reading the magnetic data by using the magnetic head 5 has already finished or not. If reading the magnetic data has not yet finished (Step S1: NO), the CPU 101 updates a total detection number counter (Step S2). Incidentally, as shown in FIG. 4, the 'total detection number counter' is used for counting up the number of data (the total number of data) in the detected magnetic data, being irrelevant to the size of the data storage buffer.

Next, the CPU 101 judges whether the data storage buffer has an available space or not (Step S3). If it is judged that the buffer has an available space (Step S3: YES), the magnetic data is stored in the data storage buffer (Step S4). Then, at the same time, a stored data counter gets updated (Step S4). Incidentally, as shown in FIG. 4, the 'stored data counter' keeps on counting up until the data storage buffer becomes full. In the case of an example of FIG. 4, the size "N" of the data storage buffer is the maximum value of the stored data counter. In the present embodiment, "N" shows the number of magnetic data that can be recorded in one line in a longitudinal direction of the card 4.

As described above, the magnetic data of the card 4 is read by the magnetic card reader 1, and stored in the data storage buffer. The magnetic data is composed of bitwise serial data. Then, while reading bitwise serial data sequentially, the magnetic card reader 1 detects an interrupt signal for each bit. Namely, an interrupt signal is generated at each time of reading the serial data of each bit, and then the magnetic data of the card 4 is stored in the data storage buffer of the magnetic card reader 1, corresponding to each of 0-bit, 1-bit, - - - (N−1)-bit. Then, at the time when the magnetic data is stored in the data storage buffer, the stored data counter counts up according to the interrupt signal generated for each bit. The stored data counter keeps on counting up until the data storage buffer becomes full.

In the meantime, according to the interrupt signal described above, the total detection number counter counts up the number of data (the total number of data) in the detected magnetic data, being irrelevant to the size of the data storage buffer. In other words; when the magnetic data is stored in the data storage buffer, the total detection number counter also counts up according to the interrupt signal while the stored data counter counts up on the other hand. Furthermore, even after the data storage buffer has been filled with the magnetic data (i.e., even after the stored data counter has stopped counting up), the total detection number counter still counts up according to the interrupt signal read by the magnetic card reader 1. On this occasion, the read magnetic data is omitted, without being stored.

Then, after the process of Step S4 finishes, operation returns to Step S1 to repeat the processes of Step S1 to Step S4 until reading the magnetic data finishes. Incidentally, even when there exists no space in the data storage buffer at the process of Step S3 (Step S3: NO), operation also returns to Step S1 in the same manner. Therefore, in this case, the stored data counter is not updated (Namely, the stored data counter does not count the part exceeding the data storage buffer).

If the reading operation of the magnetic data (reading the magnetic data) is already finished at the process of Step S1 (Step S1: YES), the CPU 101 judges whether the total detection number is greater than the prescribed first threshold or not (Step S5). More specifically to describe, executing the programs described above; such as the first comparing program, the first judgment program, and the first transmission program; as required, the CPU 101 transmits the data as effective magnetic data to the higher-level device 10 (Step S6) if the value indicated by the total detection number counter (the total number of data in the magnetic data) is less than or equal to the prescribed first threshold (Step S5: NO).

On the other hand, if the value indicated by the total detection number counter (the total number of data in the magnetic data) is greater than the prescribed first threshold (Step S5: YES), the CPU 101 executes the first omitting program described above to omit the data (without the process of Step S6), and then executes the process of Step S7 (clearing the buffer). At the process of clearing the buffer, the counters may be cleared arbitrarily, as required.

Thus, through making a comparison between the total number of data in the magnetic data and the prescribed first threshold (Step S5), it becomes possible to transmit only the data, which is judged to be effective magnetic data, to the higher-level device 10. As a result, it becomes possible to eliminate false recognition on data receiving caused by radio waves, and to improve the environment resistance performance such as resistance against radio-waves, resistance against noises, and the like. Although, in the first embodiment, the process of Step S5 is necessarily carried out after completion of the reading operation of the magnetic data (reading the magnetic data), conditions for carrying out the process of Step S5 may be specified, for example, as shown in FIG. 5.

Figure 5:
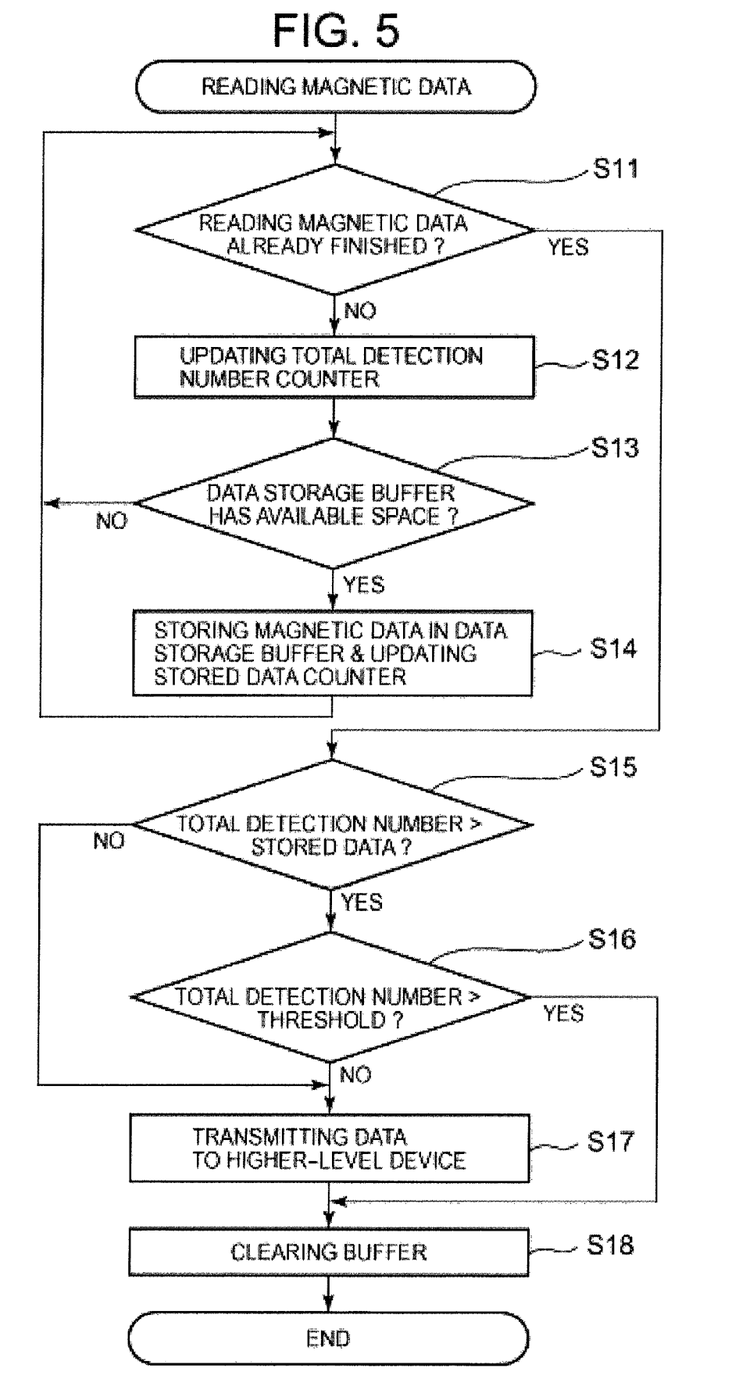
FIG. 5 is a flowchart showing an operation flow of a magnetic data reading method according to a modification of the first embodiment of the present invention.

FIG. 5 is a flowchart showing an operation flow of a magnetic data reading method according to a modification of the first embodiment of the present invention.

In FIG. 5, processes of Step S11 to Step S14 are the same as the processes of Step S1 to Step S4 in FIG. 3. Furthermore, processes of Step S16 to Step S18 are the same as the processes of Step S5 to Step S7 in FIG. 3. Therefore, one and only difference is a process of Step S15.

Concretely to describe, due to presence of Step S15, a process of Step S16 by the 'first comparing section' is carried out only when the total number of data in the magnetic data (a counter value of the total detection number counter=the total detection number) is greater than the number of data in the magnetic data stored in the data storage buffer (a counter value of the stored data counter=the number of data in the stored data) (Step S15: YES). This is because; if the total number of data in the magnetic data is greater than the number of data in the magnetic data stored in the data storage buffer, the detected magnetic data is highly likely ill-affected by radio disturbance so as not to be effective magnetic data, and therefore it is needed to carry out a comparison process using the first threshold (Step S16).

On the other hand, if the total number of data in the magnetic data is less than or equal to the number of data in the magnetic data stored in the data storage buffer (Step S15: NO), it is assumed that the stored magnetic data is effective, and then the data is transmitted to the higher-level device 10 (Step S17). When the total number of data in the magnetic data is less than or equal to the number of data in the magnetic data stored in the data storage buffer, a relationship described below is generally achieved: i.e., "the total number of data in the magnetic data is equal to the number of data in the magnetic data stored in the data storage buffer."

If the comparison process is carried out only when an overflow is observed at the data storage buffer, it is not required to always fulfill a function of the first comparing section. Accordingly, a software-wise processing load can be reduced.

As described above, the magnetic card reader 1 according to the first embodiment has a function of counting the number of data detected during the operation to the end (the total number of data in the magnetic data). In other words, the magnetic card reader 1 has a counter for counting the number of data stored in the data storage buffer, as well as a counter for counting the total detection number of the magnetic data. Therefore, it becomes possible to make a judgment software-wise by using a threshold in order to decrease a frequency of erroneous notifications to the higher-level device 10. For example, even in the case having effect of radio disturbance, it is possible to decrease a chance of transmitting an erroneous notification to the higher-level device 10. As a result, the environment resistance performance of the magnetic card reader 1, such as resistance against radio-waves, resistance against noises, and the like can be improved.

Furthermore, wherein meaningless magnetic data (i.e., ineffective magnetic data) is generated due to problems of the environment in which the magnetic card reader 1 according to the first embodiment is installed (being attributed to a fact that the magnetic card reader 1 is installed under a poor environment in which, for example, radio-waves of a certain frequency range are continually transmitted); if such frequent transmission of meaningless magnetic data (i.e., ineffective magnetic data) to the higher-level device 10, and frequent error handling operations for the data in the higher-level device 10 can be avoided, the operation stability of the system can be improved.

Moreover, as already explained by using FIG. 5; if the comparison process (Step S16 in FIG. 5) is carried out only when the certain condition is fulfilled (Step S15: YES in FIG. 5), it is not required to always fulfill the function of the first comparing section, and therefore, a software processing load can be reduced.

Furthermore, used as the prescribed first threshold is a value calculated by adding the prescribed first number of data (10% in the first embodiment) to the number of data in the magnetic data recorded in the magnetic card specified according to ISO standards. Thus, when the card 4 conforming to ISO standards is swiped (transferred manually), it can be precisely judged whether the magnetic data acquired by using the magnetic head 5 is effective data or not.

Incidentally, at the time of precisely judging whether the magnetic data acquired by using the magnetic head 5 is effective data or not, a judgment is made software-wise by using a threshold. Therefore, adjusting the threshold at any timing arbitrarily enables coping flexibly with change of the environment, and improving the flexibility.

Second Embodiment

In the second embodiment, ineffective magnetic data caused by a disturbance such as a noise and the like is eliminated as much as possible to improve operation stability at the time of reading the magnetic data, and also to improve the user operability. Specifically to describe, in a magnetic card reader 1 for reading magnetic data recorded in a card 4 by using a magnetic head 5, the magnetic card reader 1 includes: a comparing section for comparing the number of data in the magnetic data read by using the magnetic head 5 with a prescribed threshold, and a judgment section for judging that the magnetic data is ineffective if the number of data is less than or equal to the prescribed threshold at the comparing section. The second embodiment is described below.

In the magnetic card reader 1 according to the second embodiment, electrical components, such as the CPU 101, the RAM 104, and the ROM 105, constitute a 'second comparing section' and a 'second judgment section'. More specifically to describe, the ROM 105 stores a second comparing program for comparing the number of data in the magnetic data read and acquired by using the magnetic head 5 with a prescribed second threshold, as well as a second judgment program for judging that the magnetic data is error data when the number of data is less than or equal to the prescribed second threshold. Then, using the RAM 104 as a working area, the CPU 101 materializes the functions of the 'second comparing section' and the 'second judgment section' through executing these programs. Incidentally, in the second embodiment, the prescribed second threshold is stored in the RAM 104, but the second threshold may as well be stored in a memory such as an EEPROM or the like prepared separately. Furthermore, adopted as the prescribed second threshold is the second number of data, which can be processed in the higher-level device, among the total number of data in the magnetic data recorded in one line in the longitudinal direction of the card 4. Then, in the second embodiment, the second threshold is set to be approximately ⅓ of the total number of data, being based on experience. When the number of data is approximately ⅓ of the total number of data or greater, it is assumed from experience that the data transmitted to the higher-level device can be somewhat processed there. Furthermore, empirically the number of data of electrical noises due to the environmental condition is often less than about ⅓ of the total number of data in the magnetic data recorded in one line in the longitudinal direction of the card-like medium. Therefore, the threshold is set to be approximately ⅓ of the total number of data. Incidentally, 'the total number of data in the magnetic data' is a value excluding the number of data for hardware-wise omission.

Furthermore, the ROM 105 also stores a second omitting program for omitting the magnetic data of the prescribed second number of data (for example, of approximately 16 bits) out of the magnetic data read and acquired by using the magnetic head 5. Then, using the RAM 104 as a working area, the CPU 101 executes this program. Therefore, an 'omitting section' is also composed of electrical components, such as the CPU 101, the RAM 104, and the ROM 105. Explained below in detail is an operation flow of a magnetic data reading method according to the electrical structure describe above.

Figure 6:
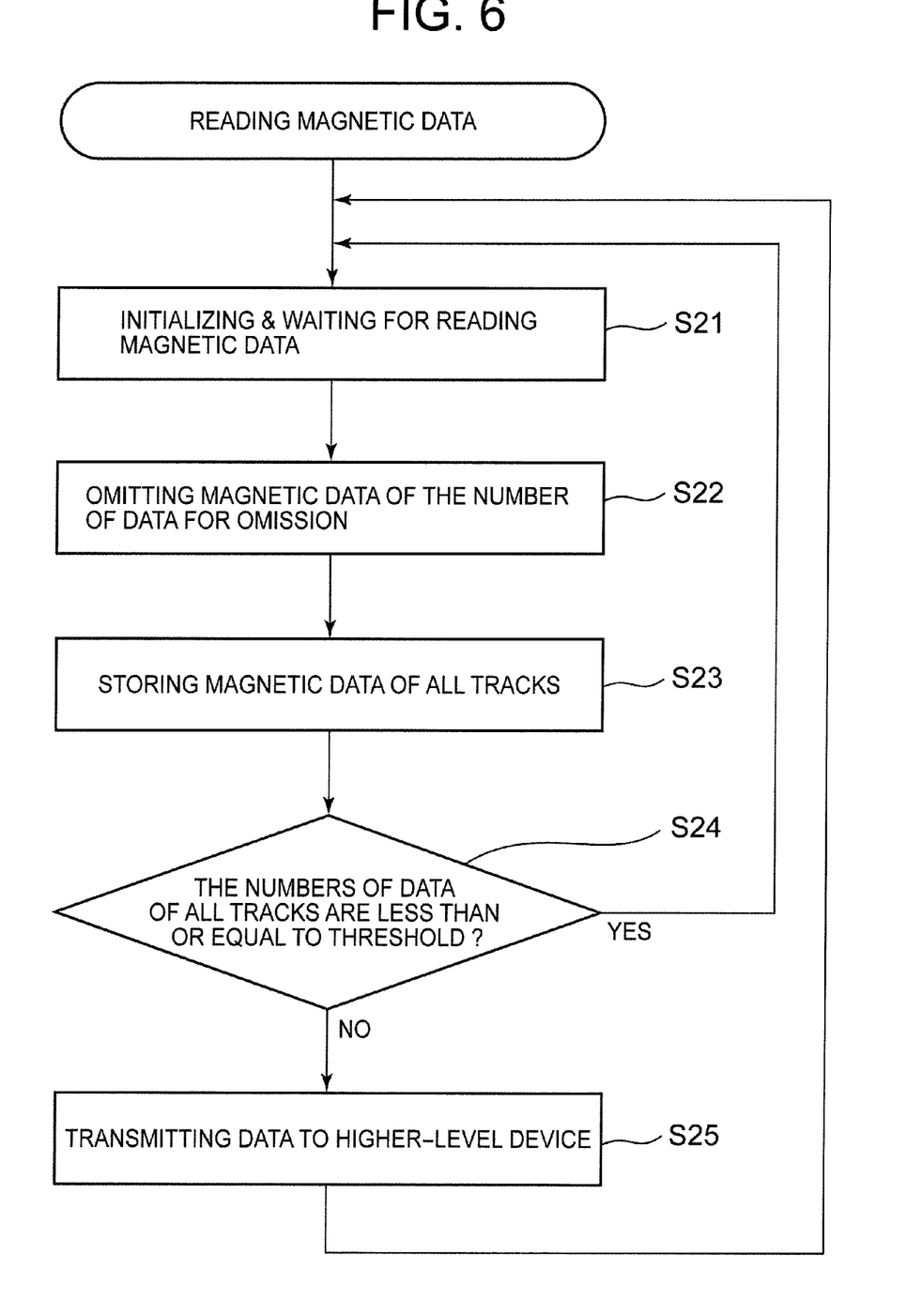
FIG. 6 is a flowchart showing an operation flow of a magnetic data reading method according to a second embodiment of the present invention.

FIG. 6 is a flowchart showing an operation flow of a magnetic data reading method according to the second embodiment of the present invention.

In FIG. 6, initializing as well as waiting for reading magnetic data (reading operation) is carried out at first (Step S21). Concretely to describe, the CPU 101 of the magnetic card reader 1 executes an initializing program stored in the ROM 105, and then subsequently stands by until the card 4 is swiped (transferred manually).

Next, when the card 4 contacts the magnetic head 5, an omission process is carried out by hardware (Step S22). Specifically to describe, the CPU 101 of the magnetic card reader 1 executes the second omitting program described above for digital data acquired through the magnetic head 5, the AMP circuit 102, and the demodulating circuit 103 in order to omit the magnetic data of the number of data that is mechanically unstable (several bits (16 bits in the present embodiment)). Then, the CPU 101 stores the detected magnetic data into the buffer (RAM 104) (Step S23). Namely, the number of magnetic data stored in the buffer corresponds to the total number of data in the magnetic data recorded in one line in the longitudinal direction of the card-like medium.

In the present embodiment, since the magnetic stripe 41 includes a plurality of tracks, magnetic data of all the tracks is stored in the buffer. Moreover, after completion of reading the magnetic data (reading operation), the number of data read out of each track (the number of bits) is stored (in another area of the RAM 104, or the like).

Then, a software-wise judgment process by using a threshold is carried out. Specifically to describe, the CPU 101 of the magnetic card reader 1 executes the second comparing program and the second judgment program that are described above. As a result, it is judged whether the number of data (the number of bits) read from each of all the tracks is less than or equal to the prescribed second threshold (Step S24). If the numbers of data read from all the tracks are less than or equal to the prescribed second threshold (Step S24: YES), the read data is judged to be ineffective. Then, being judged as data caused by erroneous reading due to disturbance (the magnetic data has been read incorrectly), the magnetic data is omitted, and no data processing of Step S25 is carried out. In this case, operation returns to Step S21. Thus, even when the magnetic card reader 1 is used under a poor environment including a serious disturbance (even if the magnetic data read (through reading operation) at most of the tracks is less than or equal to the second threshold), frequent transmission of erroneous notification to the higher-level device 10 is suppressed.

In the meantime, if there exist any track having the number of data greater than the second threshold (Step S24: NO), operation proceeds to data processing of Step S25. Specifically to describe, the CPU 101 of the magnetic card reader 1 transmits the magnetic data, being in condition before decoding, to the higher-level device 10.

On this occasion, at the time of transmitting the magnetic data in condition before decoding, to the higher-level device 10, the data of any track having the number of read data (through reading operation) less than or equal to the second threshold is not transmitted (the magnetic data is omitted). Thus, only the data of a track having the number of read magnetic data (through reading operation) greater than the second threshold is transmitted to the higher-level device 10.

In the end, after completion of data transmission to the higher-level device 10, initialization is carried out. In other words, the CPU 101 clears all the buffer (RAM 104) to get prepared for the next operation of reading magnetic data (reading operation). Meanwhile, in the higher-level device 10, the CPU 110 acquires contents of the magnetic data by using the decoder 106.

As described above, the magnetic card reader 1 according to the second embodiment includes the omission process by hardware (Step S22 in FIG. 6) as well as the software-wise judgment process by using the threshold (Step S24 in FIG. 6). Therefore, it becomes possible to eliminate erroneous data caused due to a disturbance such as a noise, as much as possible, and also to make the effective magnetic data reproducible. As a result, the magnetic data can be read stably, and the stability of reading the magnetic data can be improved.

Furthermore, frequent transmission of erroneous notification to the higher-level device 10 can be suppressed (Step S24: YES in FIG. 6), and the higher-level device 10 does not need to request the device user to carry out operation again so that the user operability can be improved. Moreover, even when there exists a mixture of effective magnetic data and ineffective magnetic data, only the effective magnetic data is picked up (Step S25 in FIG. 6). Therefore, the number of swiping operations (manual transfer operations) can be reduced, and the operability can be improved on this viewpoint as well.

Moreover, when data omission is carried out hardware-wise uniformly with the predefined number of data for omission, changing the number of data for omission requires a change in the process circuit. However, for the magnetic card reader 1 according to the second embodiment, it is easy to make a change to the second threshold (also, on the timing of change; e.g., at the time of initial setup, while the system is in operation, etc.), and a flexible response to a change in the environment can be materialized.

Then, by minimizing the number of data for omission in the case of uniformly omitting the data hardware-wise, the function of the omitting section can specialize in removal of a mechanically-unstable data part caused at the time of starting operation.

Furthermore, in the second embodiment; when detected is the prescribed second number of data or greater, which can be processed in the higher-level device, e.g., the number of (magnetic) data corresponding to approximately ⅓ of the data or greater, among the total number of data in the magnetic data recorded in one line in the longitudinal direction of the card 4, it is judged that the magnetic data has been read correctly (through reading operation) (Step S24: NO in FIG. 6). Therefore, it becomes possible to efficiently discriminate between effective magnetic data and ineffective magnetic data.

Moreover, for the card 4 including a plurality of tracks as well, the second comparing section makes a comparison for each track between the number of data in the magnetic data read and acquired by using the magnetic head 5 and the prescribed second threshold. Therefore, only the data of a track having the number of read magnetic data (through reading operation) greater than the second threshold can be transmitted to the higher-level device 10. Accordingly, unnecessary transmission of data (erroneous notification) to the higher-level device 10 can be suppressed.

Modification of the Second Embodiment

Figure 7:
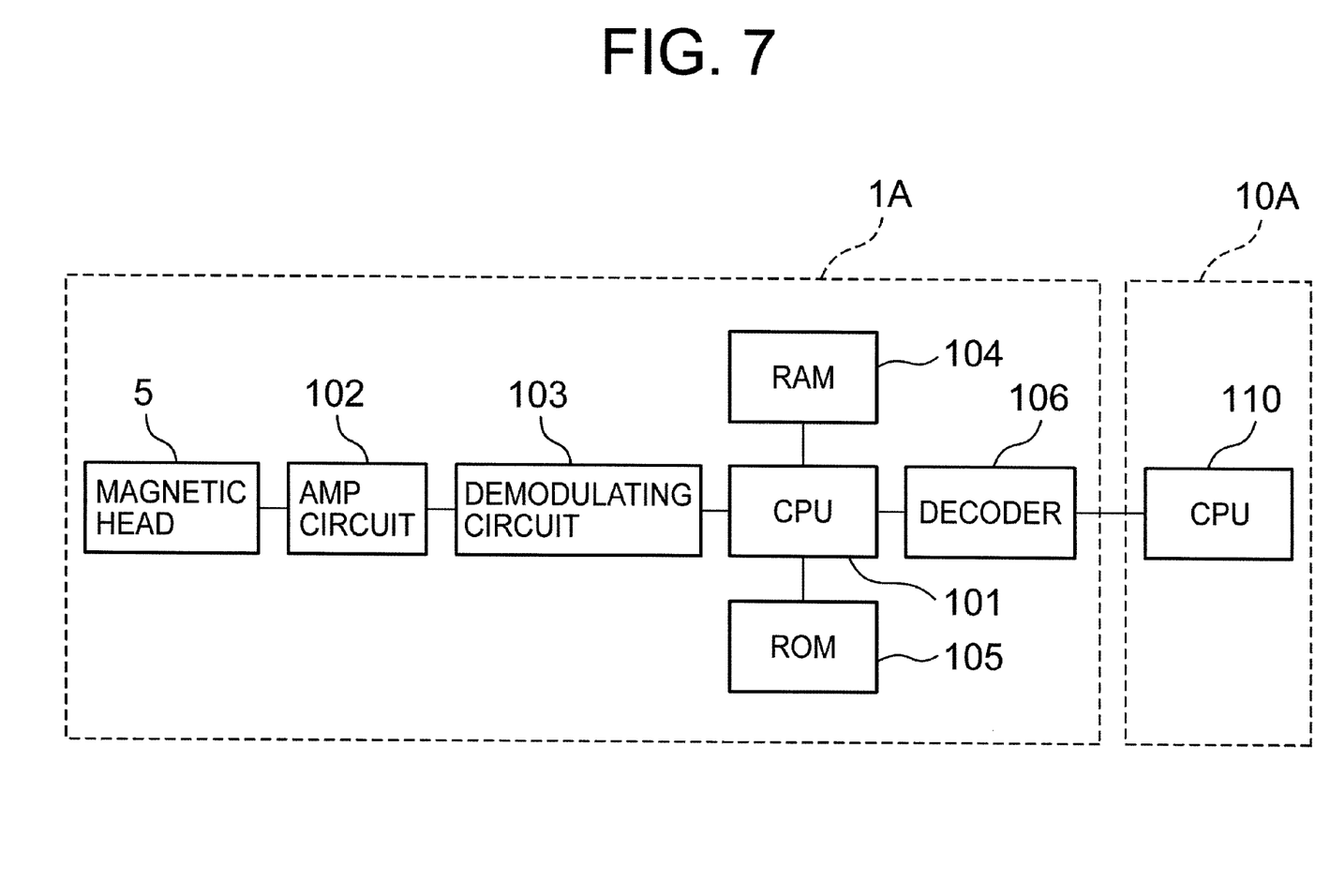
FIG. 7 is a block diagram showing an electrical structure of a magnetic card reader according to a modification of the second embodiment of the present invention.

FIG. 7 is a block diagram showing an electrical structure of a magnetic card reader 1A according to a modification of the second embodiment of the present invention.

Being different from the magnetic card reader 1 shown in FIG. 2, the magnetic card reader 1A shown in FIG. 7 includes a decoder 106. In other words, a decoding process in FIG. 7 is carried out not in a higher-level device 10A, but in the magnetic card reader 1A. Even in this case, a software-wise process by using a threshold before the decoding process makes it possible to judge whether there exists correct data or erroneous data in effective magnetic data. Therefore, the correct data, which is effective and the magnetic card reader is able to process, can be transmitted to the higher-level device 10A. Namely, any ineffective magnetic data as well as any erroneous data, which is effective but cannot be processed, are not transmitted; and accordingly, unnecessary transmission of data (erroneous notification) to the higher-level device 10A can be avoided.

Though the omission process by hardware is carried out in the second embodiment, the omission process may not be implemented. In this case, the second threshold may be specified with a value that is approximately ⅓ of all the magnetic data recorded in one line along the total length of the card 4 (i.e., approximately ⅓ of the number of data in the magnetic data including the number of data for omission (the value being the prescribed number of data which can be processed in the higher-level device)).

Furthermore, though the omission process by hardware is carried out as removal of a mechanically-unstable data part caused at the time of starting operation in the second embodiment, the omission process is not limited to what is explained above. For example, an initial omission process may be carried out software-wise, and in this case, the process may be implemented software-wise in two steps. Namely, after the omission process software-wise, a software-wise process by using a threshold may be carried out.

In the first and second embodiments described above, when the magnetic card reader 1 is provided with a learning function, it also becomes possible to optimize the thresholds autonomously. More specifically to describe; at an initial stage when the magnetic card reader 1 is installed in a prescribed spot, a judgment is made with initially-specified thresholds. However, the condition of the installation environment is not uniform, and sometimes the initially-specified thresholds are not optimum for the installation spot. Then, at the time of having detected an error, the objective number of data is stored, and it is compared with the first threshold/the second threshold specified at the time. If the difference is less, the first threshold/the second threshold are set to be greater step by step. The first threshold/the second threshold are provided with their uppermost limits. The magnetic card reader may have a notifying function; such as flashing an LED, etc., or sending a command to the higher-level device, and the like; in order to give notice when either threshold reaches its uppermost limit, for prompting improvement of the condition of the installation environment.

Furthermore, for changing the first threshold/the second threshold, any one of a static method and a dynamic method may be applied. For example, a static method may be applied to specify the first threshold/the second threshold by using dipswitches, etc. at the time of initially setting the magnetic card reader; or a dynamic method using a command, etc. may be applied as well to enable changing the first threshold/the second threshold even while the magnetic card reader is in operation. By applying any such a method, a flexible action can be taken for dealing with a sudden change in the condition of the environment.

Moreover, used in the first and second embodiments are magnetic card readers of a swiping operation type. However, the magnetic card readers are not limited to that type of device, and any other type of manual card reader, or a motor-driven card reader other than a manual-type device may be used as well.

INDUSTRIAL APPLICABILITY

The magnetic card reader and the magnetic data reading method according to the present invention are useful, for the reader and the method can improve operation stability at the time of reading magnetic data, and also improve its user operability. Furthermore, the magnetic card reader according to the present invention is useful, for improving the environment resistance performance of the magnetic card reader such as resistance against radio-waves, resistance against noises, and the like.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A magnetic card reader, for reading magnetic data comprising bitwise serial data recorded in a card-like medium by using a magnetic head, comprising:
    a storage section for storing the magnetic data read and acquired from the card-like medium by using the magnetic head;
    a stored data counter configured to count a number of data stored in the storage section based on an interrupt signal generated at each time of reading the serial data of each bit of the magnetic data;
    a total detection number counter configured to count a total number of data in the magnetic data read based on the interrupt signal;
    a first comparing section for comparing the total number of data in the magnetic data with a prescribed first threshold; and
    a first judgment section for judging that the magnetic data is effective data based on the total number of data in the magnetic data being less than or equal to the prescribed first threshold in the first comparing section;
    wherein the total number of data is the number of read data when the magnetic reading operation is finished reading the card-like medium;
    wherein the prescribed first threshold is a value calculated by adding a prescribed first number of data to the number of data in the magnetic data recorded in the magnetic card specified according to ISO standards; and
    wherein, in a case that the number of read data when the magnetic reading operation is finished is less than or equal to the value calculated by adding the prescribed first number of data to the number of data in the magnetic data recorded in the magnetic card specified according to ISO standards, the magnetic data is judged as the effective data by the first judgment section.

2. The magnetic card reader according to claim 1;
    wherein the first comparing section compares the total number of data in the magnetic data with the prescribed first threshold, based on the total number of data in the magnetic data being greater than the number of data in magnetic data stored in the storage section.

3. The magnetic card reader according to claim 1;
    wherein the magnetic card reader further comprises a counter for counting the total number of data in the magnetic data and the number of the data in magnetic data stored in the storage section.

4. The magnetic card reader according to claim 1;
    wherein magnetic data judged to be effective by the first judgment section is transmitted to a higher-level device; and
    meanwhile magnetic data judged not to be effective by the first judgment section is omitted.

5. A magnetic card reader, for reading magnetic data comprising bitwise serial data recorded in a card-like medium by using a magnetic head, comprising:
    a total detection number counter configured to count a total number of data in the magnetic data read from the card-like medium by the magnetic head based on an Interrupt signal generated at each time of reading the serial data of each bit of the magnetic data;

a comparing section for comparing the total number of data in the magnetic data read and acquired by using the magnetic head with a prescribed threshold; and a judgment section for judging that the magnetic data is ineffective data based on the total number of data being less than or equal to the prescribed threshold in the comparing section.

6. The magnetic card reader according to claim 5;

wherein the magnetic card reader further comprises an omitting section for omitting the magnetic data of a prescribed number of data out of the magnetic data read and acquired by using the magnetic head.

7. The magnetic card reader according to claim 5;

wherein the prescribed threshold is the prescribed number of data, which can be processed in the higher-level device, among the total number of data in the magnetic data recorded in one line in the longitudinal direction of the card-like medium.

8. The magnetic card reader according to claim 5;

wherein the card-like medium has a plurality of tracks in which magnetic data is recorded; and wherein the comparing section makes a comparison for each track between the number of data in the magnetic data read and acquired by using the magnetic head and the prescribed threshold.

9. The magnetic card reader according to claim 5;

wherein magnetic data, which the judgment section judges to be ineffective data, is omitted.

10. A magnetic data reading method comprising:

reading magnetic data comprising bitwise serial data recorded in a card-like medium by using a magnetic head;

a counting a total number of data in the magnetic data read from the card-like medium by the magnetic head based on an interrupt signal generated at each time of reading the serial data of each bit of the magnetic data;

comparing the total number of data in the magnetic data read and acquired by using the magnetic head with a prescribed threshold; and judging that the magnetic data is ineffective data based on the total number of data being less than or equal to the prescribed threshold.

\* \* \* \* \*